(No Model.)

J. W. CARTER.
CELL FOR ELECTRIC BATTERIES.

No. 337,045. Patented Mar. 2, 1886.

WITNESSES:
Jos. H. Rosenbaum.
Martin Petry.

INVENTOR
John W. Carter
BY
Goepel & Raegener
ATTORNEYS.

UNITED STATES PATENT OFFICE.

JOHN W. CARTER, OF BROOKLYN, NEW YORK.

CELL FOR ELECTRIC BATTERIES.

SPECIFICATION forming part of Letters Patent No. 337,045, dated March 2, 1886.

Application filed September 2, 1885. Serial No. 175,963. (No model.)

*To all whom it may concern:*

Be it known that I, JOHN W. CARTER, of Brooklyn, in the county of Kings and State of New York, have invented certain new and useful Improvements in Cells for Electric Batteries, of which the following is a specification.

This invention relates to a cell for electric batteries of large size, the object being to dispense with the fragile and expensive glass cells and substitute a stronger and more durable cell.

The invention consists of a cell for electric batteries, which comprises a metal body and an interior lining of rubber vulcanized thereto, said lining being extended over the edge of the vessel, so as to form a protecting-rim therefor.

Figure 1:
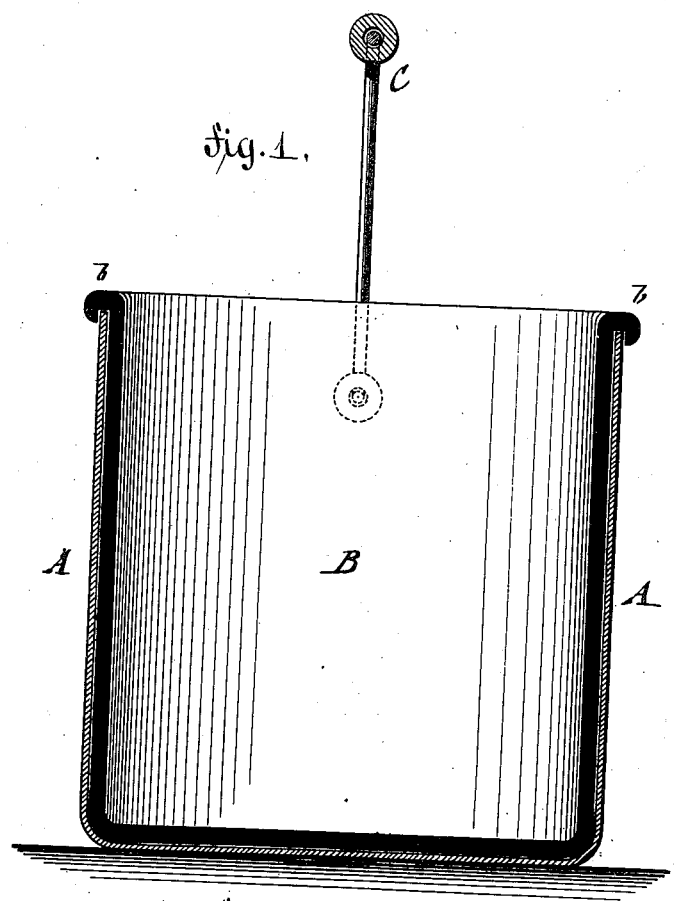
Figure 2:
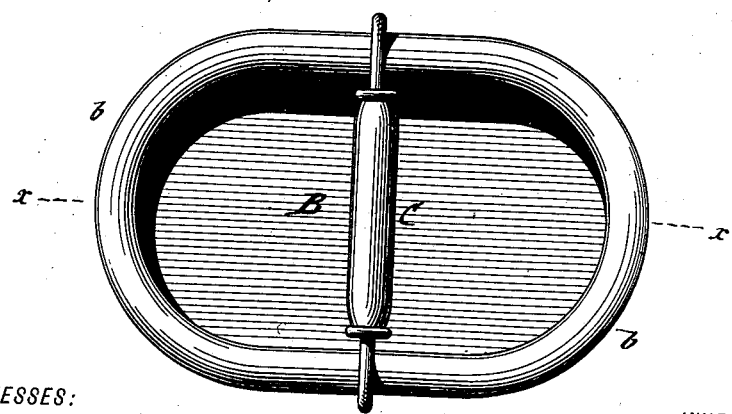

In the accompanying drawings, Figure 1 represents a vertical longitudinal section on line $x$ $x$, Fig. 2, of my improved cell for electric batteries. Fig. 2 is a plan of the same.

Similar letters of reference indicate corresponding parts.

In the drawings, A represents the metallic body of my improved cell, which body is made of stout sheet or cast metal, and B represents the lining therefor, which is composed of hard rubber vulcanized to said body.

In constructing the cell the inner surface of the body A is first coated with copper, in order to facilitate the adhesion of the rubber lining. The so-coated body is then covered with a plastic rubber compound, and then subjected to the ordinary vulcanizing process. The lining B is extended over the edge of the body A, so as to form a rib, $b$, that protects the edge of the metallic body against corrosion by the acid.

Such cells can be constructed in any desired size, and are especially desirable for batteries of large size, as they are not so liable to breakage while in use or in course of shipment as the glass cells heretofore in use.

This cell is preferably provided with a bail, $c$, for convenience of handling.

The same construction may also be used for different vessels for various purposes.

I am aware that vessels lined with india-rubber or other acid-resisting material are well known, and I do not claim the same. In these vessels there was no necessity of covering the edges of the vessels, which, however, is essential in my cell, as thereby the corrosion of the metallic body of the cell is prevented.

Having thus described my invention, I claim as new and desire to secure by Letters Patent—

A cell for electric batteries, consisting of a metallic body and an interior lining of hard rubber vulcanized thereto, said lining being extended over the edge of the vessel, so as to form a protecting rim, substantially as set forth.

In testimony that I claim the foregoing as my invention I have signed my name in presence of two subscribing witnesses.

JOHN W. CARTER.

Witnesses:
PAUL GOEPEL,
ERNST WOLFF.